United States Patent [19]

Ohkuma et al.

[11] 4,309,916
[45] Jan. 12, 1982

[54] BEARING APPARATUS FOR GEAR TYPE POWER TRANSMISSION SYSTEM

[75] Inventors: Takeo Ohkuma, Fujisawa; Kyozaburo Furumura, Chigasaki; Akihiko Tanaka, Fujisawa; Shinichi Shirota, Yokohama, all of Japan

[73] Assignee: Nippon Seiko Kabushiki Kaisha, Tokyo, Japan

[21] Appl. No.: 112,111

[22] Filed: Jan. 14, 1980

Related U.S. Application Data

[63] Continuation of Ser. No. 882,858, Mar. 2, 1978, abandoned.

[30] Foreign Application Priority Data

Mar. 3, 1977 [JP] Japan .................................. 52-22252

[51] Int. Cl.³ ............................................. F16H 57/04
[52] U.S. Cl. ................................... 74/467; 184/6.12; 184/11 A; 308/187.2
[58] Field of Search ................. 74/467, 331; 184/6.12, 184/11 A, 11 R, 13 R; 308/187, 187.2

[56] References Cited

U.S. PATENT DOCUMENTS

| | | | |
|---|---|---|---|
| 1,929,183 | 10/1933 | Zilen | 308/187 |
| 2,135,477 | 11/1938 | Griswold | 308/187 |
| 2,171,176 | 8/1939 | Greve | 74/417 |
| 3,167,969 | 2/1965 | Dilworth et al. | 74/467 |
| 3,198,735 | 8/1965 | Lamson et al. | 308/187 |
| 4,090,748 | 5/1978 | Sugimoto | 184/11 R |
| 4,222,283 | 9/1980 | Nagy | 184/11 A |
| 4,227,427 | 10/1980 | Dick | 74/467 |

Primary Examiner—C. J. Husar
Assistant Examiner—Conrad Berman
Attorney, Agent, or Firm—Shapiro and Shapiro

[57] ABSTRACT

Bearing apparatus for gear type power transmission systems comprising a gear casing containing a lubricating oil, gearing for power transmission retained in the casing and a bearing carried in the casing for rotatably supporting the gear shaft employs a seal for the bearing containing a lubricant so that the bearing is lubricated separately and independently of the oil in the casing.

15 Claims, 2 Drawing Figures

BEARING APPARATUS FOR GEAR TYPE POWER TRANSMISSION SYSTEM

This is a continuation application of Ser. No. 882,858, filed Mar. 2, 1978, now abandoned.

BACKGROUND OF THE INVENTION

1. Field of the Invention

The present invention relates to improvements in bearing apparatus for gear type power transmission systems which comprises a gear casing or housing containing therein a lubricating oil for gears and the like, gearing for a power transmission retained in the casing and a bearing positioned in the casing for rotatably supporting the gear shaft, the bearing being a ball bearing, conical roller bearing, cylindrical roller bearing, needle bearing or spherical bearing.

2. Description of the Prior Art

A known bearing hitherto used in the above mentioned type of bearing apparatus is of open type in which no sealing element is provided and the lubrication of the bearing is effected by way of immersion lubrication or splash lubrication. For immersion lubrication, the bearing is immersed in oil retained in the gear casing. For splash lubrication, the bearing receives lubricating oil splashed by the gears as the gear shaft rotates.

In this kind of gear type power transmission system such as a transmission and reduction gear system, there are problems of wear of the bearing. As well known in the art, fine particles, resulting from the abrasion between the gears and the wear at other parts and due to lapping compound falling off the gear teeth where the lapping compound has adhered at the time of gear finishing, often penetrate into the lubricating oil retained in the gear casing as foreign matter. After being mixed with the lubricating oil, such contaminant foreign particles enter the interior of the bearing together with the oil and causes wearing of the bearing and early flaking thereof. Thereby, the effective life of the bearing is substantially shortened. This kind of trouble is most evident in bearings used in automobile transmissions. The foreign particles bite into the race surface of the bearing to form indentations thereon. From these indentations, cracks are developed which lead to an early flaking of the bearing. This type of bearing breaking or so-called surface originated flaking has been ascertained in various experiments.

Also, for final reduction gear systems (differential gear system) of automobiles employing conical roller bearings, it has been found that the axial clearance of the bearing becomes unduly large as a result of the above mentioned wear of the bearing so that the pressure preloading on the bearing is lost and thereby the maneuverability of the running car is reduced to a great extent while generating a harsh noise.

As a solution to this problem, it has been known to use a sealed bearing provided with a filter capable of filtering off the foreign matter or particles contained in the lubricating oil so as to prevent it from penetrating into the bearing. Such technique is disclosed Japanese Utility Model Publications No. 9307/1958 and No. 24167/1968. However, this known solution is not satisfactory and has the limitation that lubrication of the bearing is effected solely by lubricating oil which is contaminated with very fine foreign particles in the gear casing. The filter-ability of the filter provided in the bearing is not sufficient to filter out all foreign matter particles which may be extremely fine. Furthermore, there often may be insufficient lubrication of the bearing caused by filter clogging. For these reasons, the known solution has been found to be unsatisfactory to solve the problem of bearing wearing as described above. In this connection, it should be noted that all the known solutions to this problem are based upon the common knowledge in the art that the bearings used in power transmission gearing system be lubricated with oil reserved in the gear casing.

SUMMARY OF THE INVENTION

Accordingly, it is a general object of the invention to eliminate the above described problems regarding the bearing in gear type power transmission systems.

It is still more specific object of the invention to provide an improved bearing apparatus which enables the prevention of fine foreign matter particles which result from abrasion between the gears in mesh and lapping compound remaining on the teeth of gears from penetrating into the bearing.

It is another specific object of the invention to provide an improved bearing apparatus which enables the prevention of the penetration of foreign matter particles into the bearing and in which the lubrication of bearing can be effected primarily by a lubricant enclosed in the bearing itself, rather than by the lubricant oil reserved in the gear casing.

To attain the above and other objects according to the invention, there is provided a bearing apparatus of the aforementioned type comprising a sealed bearing provided with a sealing element and containing therein a lubricant suitable for the lubrication of the bearing.

The present invention is based upon an entirely novel concept apart from the above described common knowledge in the art. The lubricating oil retained in the gear casing is not used to lubricate the bearing so long as the lubricant enclosed in the bearing remains effective. The lubricant enclosed in the sealed bearing according to the invention is such liquid lubricant that is suitable for lubrication of the bearing and has a higher viscosity than that of the oil conventionally reserved in the gear casing. The lubricant enclosed in the sealed bearing may be grease or solid lubricant. By using this bearing made in a sealed fashion and containing a lubricant therein, the above described problem involved in the bearing apparatus of the aforementioned type is satisfactorily solved.

Other and further objects, features and advantages of the invention will appear more fully from the following description taken in connection with the accompanying drawing.

DETAILED DESCRIPTION OF PREFERRED EMBODIMENTS

Figure 1:
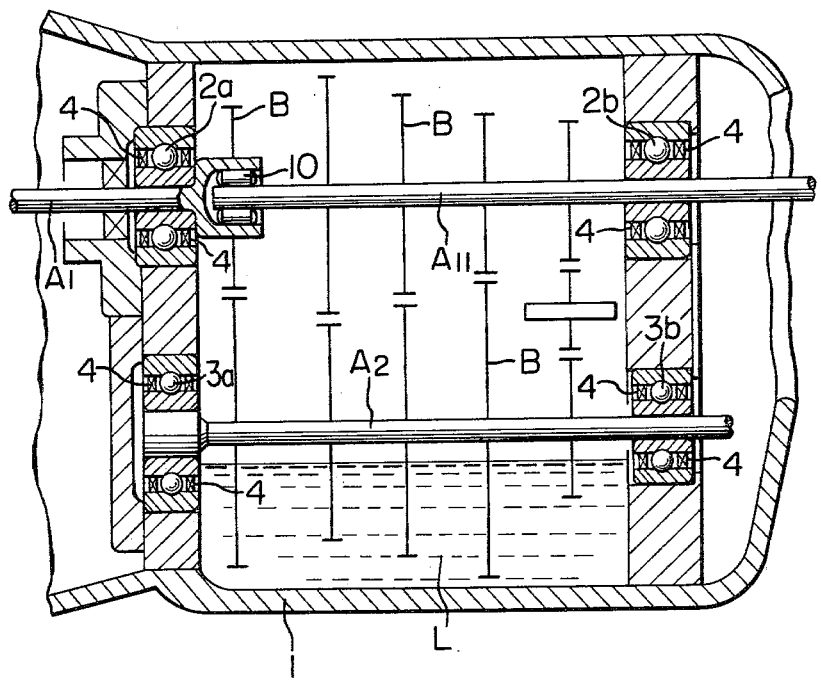
FIG. 1 is a cross-sectional view of the essential part of a bearing apparatus adopted in a gear type power transmission system showing an embodiment of the invention.

Referring first to FIG. 1 there is schematically shown a bearing apparatus in use for a transmission of a motorcar. The reference numeral 1 designates a gear casing or housing containing therein an oil L for lubrication of the gearing. Ball bearings 2a and 2b support rotatably an input shaft $A_1$ and an output shaft $A_{11}$, respectively. The input shaft $A_1$ at its one end supports rotatably the output shaft $A_{11}$ through a needle bearing 10. A countershaft $A_2$ is rotatably supported through ball bearings 3a and 3b which are immersed in oil L contained in the gear casing 1. Power transmission from the input shaft $A_1$ to the output shaft $A_{11}$ is effected by gears B attached to the input shaft $A_1$, countershaft $A_2$ and output shaft $A_{11}$ in the well known manner, these gears B being schematically shown in the drawing because they are not directly related to the invention.

According to the invention, each of the bearings 2a, 2b and 3a, 3b is sealed with a sealing element 4, of contact type in which the sealing element is directly secured to the outer race and the tip of the element contacts the inner race, and contains a lubricant enclosed therein which is, in case of this embodiment, grease. For the shown arrangement, since the countershaft supporting bearings 3a and 3b are immersed in the oil L retained in the gear casing, it is preferred that an oil resistant grease be used as the grease enclosed in the bearing. The use of oil resistant grease that does not deteriorate in operation of the bearing by the invasion of the oil will serve to further reduce the effect of the particle-contaminated oil.

Figure 2:
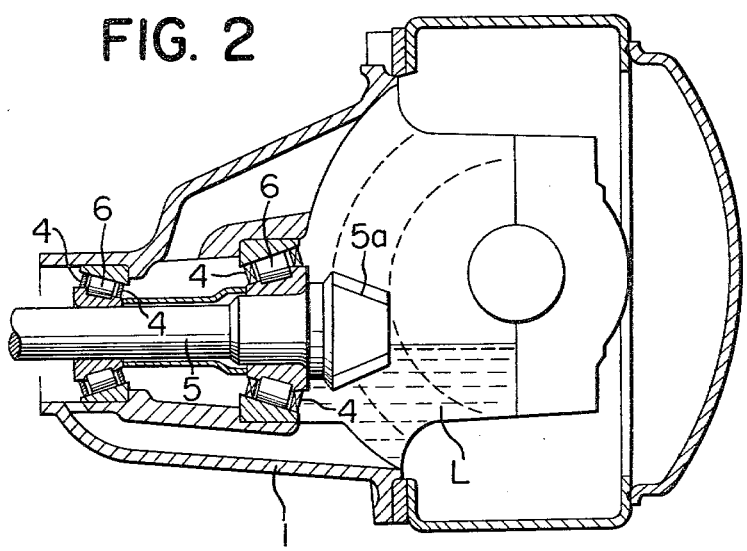
FIG. 2 is a similar view showing another embodiment of the invention.

FIG. 2 schematically shows a bearing apparatus for a final reduction gear mechanism of a motor-car wherein two conical roller bearings 6, 6 are used. Again, the reference numeral 1 designates a gear casing containing an oil L for lubrication of the gearing. A pinion shaft 5 is connected to a bevel pinion 5a which meshes with a bevel drive gear schematically shown. The pinion shaft 5 is supported rotatably by spaced bearings 6, 6. Each bearing contains therein a suitable grease and is sealed with sealing elements 4. The bearing is so disposed that the lower portion thereof is partially immersed in the oil L retained in the casing 1.

While the sealing element 4 in the above described two embodiments is shown as a sealing element of contact type directly secured to the bearing so as to form a bearing of seal built-in type, another type of sealing element also may be used for the same purpose. For example, the sealing element may be fitted to the housing or the shaft instead of directly securing it to the race of the bearing.

To demonstrate the superiority of the lubrication system according to the present invention over the conventional one, a comparative bench test on the life time of bearings was conducted employing the bearing apparatus for motor-car transmission shown in FIG. 1 and a corresponding conventional apparatus under the following test conditions:

| TEST CONDITIONS | | |
| --- | --- | --- |
| | for input and output shafts 6306 | for countershaft 6305 |
| Bearings used | outer dia. - 72mm inner dia. - 30mm width - 19mm | outer dia. - 62mm inner dia. - 25mm width - 17mm |
| Oil in casing | gear oil 90# | |
| Temperature | 80° C. ± 5° | |
| Revolution | 3000 rpm | |
| Input torque | 20 Kg. m | |
| Running time | continuous | |
| Lubrication system | conventional | input and output shaft side | splash |

| TEST CONDITIONS -continued | | |
| --- | --- | --- |
| according to the invention | countershaft side input and output shaft side | immersion lubrication with the enclosed grease |
| | countershaft side | lubrication with the enclosed grease |

The results obtained from the above test were as follows:

For the conventional lubrication system, flaking was observed after 50 hours (mean value) running time on the bearings for the input and output shafts and after 35 hours (mean value) running time on the bearings for the countershaft. In contrast, for the lubrication system according to the invention there was not observed any change on the bearings for the input and output shafts as well as the bearings for the countershaft even after 120 hours (mean value) running time respectively (running was stopped at this 120 hours running time to evaluate the effect of the invention).

Furthermore, an actual car running test was conducted to compare the degree of damage on the race of the bearing containing grease enclosed therein and provided with a sealing element according to the invention with that on the conventional bearing without any sealing element and being lubricated directly with the oil reserved in the transmission casing contaminated with the usual foreign matter. For this comparative test, there was used again the bearing apparatus used in a motor-car transmission as shown in FIG. 1. The results obtained from the test are summarized in the following table:

| | | Observations on race surfaces | |
| --- | --- | --- | --- |
| Running distance | Sites of bearings used | conventional bearings | bearings according to the invention |
| 100,000 Km | input side | a number of indentations by small and large dirt particles: surface looked pearskin | very fine indentations were found somewhere, but surface remained clean |
| 100,000 Km | output side | a number of indentations by small and large dirt particles: surface looked like a pearskin | very fine indentations were found somewhere, but surface remained clean |
| 100,000 Km | counter-front | pitching and cracks developed from the indentations | fine indentations, but no crack developed |
| 100,000 Km | counter-rear | cracks developed from the indentations | fine indentations, but no crack developed |

As will be seen from the foregoing, the bearing apparatus for geared power transmission, according to the invention, has a remarkable advantage as compared with the conventional bearing apparatus in which the bearings used for supporting the gear shaft is lubricated directly with the oil reserved in the gear casing and thereby subjected to the adverse effect of the oil contaminated with foreign matter. In the bearing apparatus according to the invention, there are used such bearings, particularly sealed with sealing elements, so as to avoid the bearings being lubricated directly with the oil in the gear casing and to exclude the adverse effect thereof. The lubrication of the bearing is effected with a lubricant such as a lubricating oil of higher viscosity than that of the oil reserved in the casing, grease or solid lubricant which is particularly enclosed in the bearing preliminarily for this purpose. Therefore, the bearing is almost free from the adverse effect of the oil in the gear casing, in particular of fine particles produced by wearing and other foreign matter particles.

Accordingly, the bearing according to the invention is able to continue operating well for a longer time without any trouble as long as the lubricant particularly enclosed therein remains effective. Even when the amount of lubricant is lessened or deteriorates after its long use to the extent that it can no longer serve to lubricate the bearing, the latter may be sufficiently lubricated with the oil filtered and penetrated into the interior of the bearing through its sealing part of the sealing element (that is, the part where the tip of the sealing element contacts with the race surface) by wetting agency or through the slight clearance between the tip of the sealing element and the race surface caused by vibration during running of car. Since the oil thus filtered and penetrated into the bearing at this time is almost free from foreign matter, the bearing is scarcely affected by particles resulted from wearing or other foreign matter. Therefore, as compared with the conventional system, wherein the lubrication of the bearing is effected, from beginning to end, by using the oil containing foreign matter within the casing, the life of the bearing according to the invention is not only lengthened, at least by the life of the lubricant enclosed in the bearing according to the invention, but also further lengthened by the replenished lubricant filtered and penetrated into the bearing as described.

In addition to the above described advantages, the present invention affords another important advantage.

In the conventional apparatus, there exist such bearings the lubrication of which is to be effected solely by splashing the oil within the casing. For example, the bearings for the input shaft $A_1$ and the output shaft $A_{11}$ shown in FIG. 1 may be pointed out as such a bearing. For such bearings, as well known in the art, there is a possibility of serious danger such as generation of heat or seizure due to an insufficient lubrication of the bearing when a failure occurs in effectively splashing the oil over the bearing. For the apparatus according to the invention in which the lubrication of the bearing is effectively performed primarily with the lubricant enclosed therein, such a possibility of generation of heat or seizure is completely excluded. This safety in operation is an important advantage of the apparatus according to the invention.

What we claim is:

1. A power transmission system for vehicles comprising a casing containing a lubricant oil, input shaft means, output shaft means, gear means for transmitting the power from the input shaft means to the output shaft means, the gear means being lubricated by the lubricant oil, and bearing means supporting the input and output shaft means, the bearing means containing a lubricant sealed from and independent of said lubricant oil.

2. A power transmission system according to claim 1, further comprising counter shaft means for transmitting the power from the input shaft means to the output shaft means therethrough, and bearing means for supporting said countershaft means, being sealed from said lubricant oil contained in said casing and containing lubricant for lubricating the bearing means supporting said countershaft.

3. A power transmission system according to claim 1 or 2, wherein said lubricant in the bearing means is lubricating oil which has a higher viscosity than that of said lubricant oil contained in the casing.

4. A power transmission system according to claim 1 or 2, wherein said lubricant in the bearing means is grease.

5. A power transmission system according to claim 1 or 2, wherein said lubricant for the bearing means is a solid lubricant.

6. A power transmission system according to claim 1 or 2, wherein said bearing means is provided with sealing means.

7. A power transmission system according to claim 6, wherein said bearing means includes an outer and inner races and balls supported therebetween, said sealing means including a pair of sealing elements each secured to one of the outer and inner races and contacting at its tip with the other one of the races.

8. A final reduction gear mechanism for vehicles comprising a casing containing a lubricant oil, pinion shaft means, the pinion shaft means being lubricated by said lubricant oil, bearing means supporting the pinion shaft means, and sealing means for the bearing means to contain a lubricant sealed from and independent of said lubricant oil.

9. A final reduction gear mechanism according to claim 8, wherein said bearing means includes outer and inner races and rollers supported therebetween, and said sealing means includes a pair of sealing elements each secured to one of said races and contacting at its tip with the other one of the races.

10. A final reduction gear mechanism according to claim 8, wherein the lubricant contained in the bearing is a lubricating oil which has a higher viscosity than said lubricant oil contained in the casing.

11. A final reduction gear mechanism according to claim 8, wherein said lubricant in the bearing means is grease.

12. A final reduction gear mechanism according to claim 8, wherein said lubricant in the bearing means is a lubricant.

13. A power transmission system for vehicles comprising a casing containing a lubricant oil, input shaft means, output shaft means, gear means for transmitting the power from the input shaft means to the output shaft means, the gear means being lubricated by the lubricant oil, and bearing means supporting said input shaft, said bearing means containing a lubricant sealed from and independent of said lubricant oil.

14. A power transmission system for vehicles comprising a casing containing a lubricant oil, input shaft means, output shaft means, gear means for transmitting the power from the input shaft means to the output shaft means, the gear means being lubricated by the lubricant oil, and bearing means supporting said output shaft, said bearing means containing a lubricant sealed from and independent of said lubricant oil.

15. A power transmission system for vehicles comprising a casing containing a lubricant oil, input shaft means, output shaft means, counter shaft means, gear means for transmitting the power from the input shaft means to the output shaft means through the counter shaft means, the gear means being lubricated by the lubricant oil, and bearing means supporting said counter shaft means, said bearing means containing a lubricant sealed from and independent of said lubricant oil.

* * * * *